United States Patent [19]

Plum

[11] Patent Number: 5,579,479
[45] Date of Patent: Nov. 26, 1996

[54] COMPUTER SOFTWARE LICENSING AUTHENTICATION METHOD AND APPARATUS

[75] Inventor: Thomas Plum, Kamuela, Hi.

[73] Assignee: Plum Hall Inc., Kamuela, Hi.

[21] Appl. No.: 316,888

[22] Filed: Oct. 3, 1994

[51] Int. Cl.⁶ ..................................................... G06F 12/14
[52] U.S. Cl. ........................ 395/188.01; 395/186; 380/4; 380/23; 364/401
[58] Field of Search ........................ 345/188.01, 187.01, 345/186; 380/4, 23; 364/401

[56] References Cited

U.S. PATENT DOCUMENTS

| | | | |
|---|---|---|---|
| 4,791,565 | 12/1988 | Dunham et al. | 395/4 |
| 4,796,220 | 1/1989 | Wolfe | 380/4 |
| 5,014,234 | 5/1991 | Edwards et al. | 395/4 |
| 5,023,907 | 6/1991 | Johnson et al. | 380/4 |
| 5,032,979 | 7/1991 | Hecht et al. | 395/4 |
| 5,222,134 | 6/1993 | Waiter et al. | 380/4 |
| 5,241,594 | 8/1993 | Kung | 380/4 |
| 5,390,297 | 2/1995 | Barber et al. | 395/200 |
| 5,421,006 | 5/1995 | Jablon et al. | 395/4 |

*Primary Examiner*—Robert W. Beausoliel, Jr.
*Assistant Examiner*—Ly V. Hua
*Attorney, Agent, or Firm*—Nixon & Vanderhye P.C.

[57] ABSTRACT

A method and apparatus provide a level of authentication or a computer software program sign-on that is intermediate trust-based licensing and hardware based protection. Entry of a registration name is required at the time of initial use of the program, and at each invocation of the program the computer determines if the invocation is within the freshness interval (based upon the number of sign-ons, e.g. 30, or the passage of time, e.g. 30 days). If the sign-on is not within the freshness level, the computer and display screen provide a re-authentication inquiry, which may require a response before a standard sign on is allowed. If the re-authentication response is at odds with the initial registration name, standard sign-on may be precluded, and the screen displays a phone/fax number or electronic address to contact for appropriate registration information. The software may be a Shell++ product, and the registration number is provided in an Init-File, a Chalkmark Checksum calculated encoded at initial registration. At each invocation the computer may also be controlled to determine if there is an Init-File in some directory in the current command search path for the software, and if is there is a Chalk-File in the same directory as an Init-File, and if the system's file version date for Chalk-File is the same as the date encoded into the Chalkmark Checksum.

20 Claims, 3 Drawing Sheets

FIG. 1
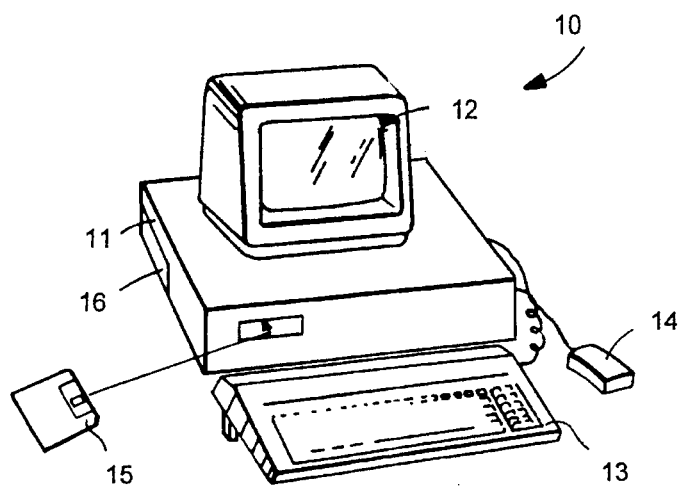
FIG. 4
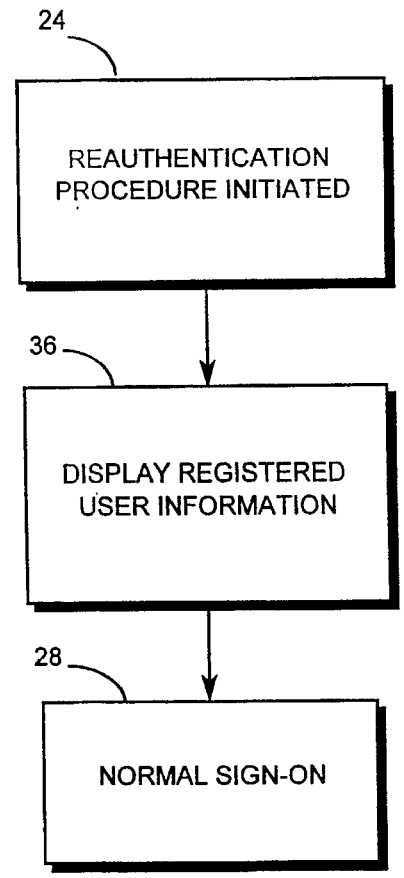
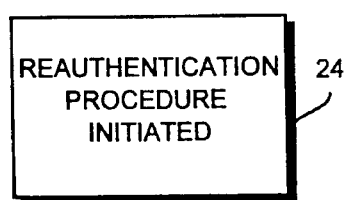
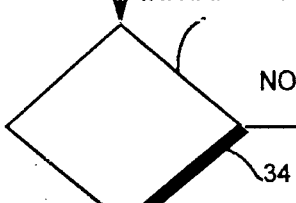
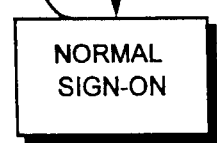
FIG. 3

INITIALIZATION FILE

| SERIAL NO. |
| --- |
| NAME |
| CHECKSUM |
| EXTENSIONS |
| PATH |
| |

CHALKMARK FILE

| CHALKMARK CHECKSUM |
| --- |

COMPUTER SOFTWARE LICENSING AUTHENTICATION METHOD AND APPARATUS

BACKGROUND AND SUMMARY OF THE INVENTION

There is an active business in "license manager software", i.e. attempting to insure that the user of software is someone who has paid the appropriate purchase or licensing fees. Most of the current systems are either "trust-based", i.e. essentially no actual protection, or hardware-based. Most hardware-based protection systems depend upon a hardware serial number (such as on Sun Microsystem's workstations), an attached small hardware device (called a "dongle") a physically unique diskette that must be mounted, or a serial number in the network software. Some methods depend upon the presence of one or more files whose sole purpose is to enforce the license authentication.

According to the present invention, a method and apparatus are provided for authentication of computer software programs that is at an intermediate level, i.e. between trust-based licensing and hardware-based protection. The invention to a large extent still requires a level of "trust", however by periodically querying users of the software it reminds the user of the need for a license while requiring some positive action on the part of the user to confirm the legitimacy of his/her use, and according to some aspects of the invention if the user is clearly unauthorized will preclude the user from utilization until authorization is obtained. However the invention is not designed to be a fail-safe system, and does not require the burdens on the legitimate user, or the expense, that often accompany hardware-based authentication systems. The invention makes use of a file which is itself of intrinsic usefulness to the end user, and makes the authentication process easy and convenient for the end user in the software distribution channel. However it is overtly vulnerable to abuse by any users who are willing to repetitively and regularly and purposefully make explicit interactive responses to lie about their identity while knowing a correctly licensed entity.

The invention will be primarily described with respect to Shell++ based software products, but it is to be understood that the invention has much broader applicability, and in fact is applicable to a wide variety of different software products. The term "Init-File" as used in the specification in claims is intended to not only relate to conventional Shell++ products' Initialization Files, but to relate to a variety of functionally equivalent files. Shell++ can be used for any number of different projects on the same system or on different systems. Each project resides in one specific directory, and in that directory there must be an initialization file, typically SPP.INI (or spp.rc on UNIX systems). The Init-File contains user-defined information that is necessary for the compilation and linking of Shell++ programs. It is therefore a file with which the end user will become familiar in the course of daily work. The installation procedures will also place into that file some simple, readily recognizable, human-readable entries for the Serial Number of the licensed copy of the software and for a Checksum. The Checksum is a deterministic function of the Serial Number (which is visible in the Initialization File), and the Licensed User Name (which is not recorded in the Initialization File). An example of an Init-File is:

Serial Number: 1234567
Checksum: 1234ABCD5678EFGH
Extensions: .c. .C .cpp .cxx .spp
Compiler PATH: /vendor/bin According to one aspect of the present invention there is provided a method of providing a level of authentication for a computer software program sign-on intermediate trust-based licensing and hardware-based protection, using a computer and a display screen having a standard sign-on procedure. The method comprises the steps of: (a) Requiring entry of a registration name at the time of initial use of the computer software program which is provided in an Init-File. (b) Providing a freshness interval based upon number of sign-ons or the passage of time [the terminology "number of sign-ons or the passage of time" inherently also includes combinations of those two parameters] as the maximum allowable hiatus between re-authentication sign-ons. (c) At each invocation of the computer software program determining if an invocation is within the freshness interval. (d) If the invocation is within the freshness interval, controlling the computer and display screen to provide standard sign-on. (e) If the invocation is not within the freshness interval, controlling the computer and display screen to provide a re-authentication query on the display screen which requires a response before standard sign-on will be allowed. (f) If a correct response to the query in step (e) is given, controlling the computer and display screen to provide standard sign-on; and (g) if an incorrect response to the query in step (e) is given, controlling the computer and display screen to provide information about authorized registration.

The term "standard sign-on" as used in the present application and claims encompasses any and all sign-on procedures. Most sign-on procedures require entry of some sort of information (e.g. key strokes on a keyboard, click on a mouse, etc.), however some sign-ons merely open up to the program and do not require anything except a previous selection of the program. The term "standard sign-on" encompasses all of these contingencies.

Step (g) may be further practiced to preclude standard sign-on to the computer software until an authorizing registration sequence has been entered into the computer, and typically is practiced, at least in part, by providing a phone or fax number or electronic address, or combinations thereof, which may be contacted for appropriate registration information on the display screen. Step (e) is typically practiced to control the display screen to query what name, using the same spelling, the software program was initially registered under, or step (e) is practiced to control the display screen to display the name of one or more registered users and inquire as to whether or not sign-on is being practiced by a registered user.

In the most sophisticated form of the invention, at each invocation of the computer software, the software/computer also determine if there is an Init-File in some directory in the current command search path for the software, and if there is not requiring re-authentication by initiating steps (e)–(g). Also, in the most sophisticated form, in response to step (a) there are the further steps of controlling the computer to compute a Chalkmark Checksum, and encoding the Chalkmark Checksum in a Chalk-File and recording the date encoded; and wherein at each invocation of the computer software also determines (i) if there is a Chalk-File in the same directory as Init-File, and (ii) if the system's file-version date for Chalk-File is the same as, within a predetermined deviation range, the date encoded into the Chalkmark Checksum; and if there is not, requiring re-authentication by initiating steps (e)–(g).

Especially where the software is a Shell++ product there is the further step of controlling the computer, in response to the query posed in step (e), to calculate a Checksum using the serial number from the Init-file and the entered registered user name, and to compare the calculated Checksum to the Checksum recorded in the Init-file.

In situations where there are at least two successive versions of the computer software, better control over licensing of successive versions is obtained by using two checksum algorithms, a current-version checksum, and a prior-version checksum. With dual checksums, a user who has not paid a fee for the current version could be advised that the current version needs a new checksum (requires a payment, giving a phone/fax number and/or electronic address), while still being allowed to use the software based upon the prior version license. This allows for a more cooperative transition period for licensed upgrades and new versions, compared to abrupt cutoff. To effect these purposes, the method comprises the further step of controlling the computer and display screen to provide a different Checksum for each of the versions to initiate steps (e)–(g) if one of the versions had not be properly registered.

To accommodate a time based demonstration period (many conventional software products can be used until a specific cutoff date) the method may comprise the further step of controlling the computer and display screen so that steps (e)–(g) are disabled for an initial predetermined period of time or number of sign-on procedures to provide a demonstration period. In implementing this procedure the method also preferably comprises the further step of controlling the computer and display screen to display a message on the display screen reminding the user, at least near the end of the demonstration period, that registration is necessary, and providing information about effecting registration.

According to another aspect of the present invention a method of providing an authentication procedure for a computer software program sign-on, using a computer and a display screen having a standard sign-on procedure, is provided which comprises the steps of: (a) Requiring entry of a registration name at the time of initial use of the computer software program which is provided in an Init-File. (b) Providing a freshness interval based upon number of sign-ons or the passage of time as the maximum allowable hiatus between re-authentication sign-ons. (c) At each invocation of the computer software program determining if an invocation is within the freshness interval. (d) If the invocation is within the freshness interval, controlling the computer and display screen to provide standard sign-on. (e) If the invocation is not within the freshness interval, controlling the computer and display screen to display the name of one or more registered users and inquire as to whether or not sign-on is being practiced by a registered user and to simultaneously provide information about authorized registration; and (f) after step (e) controlling the computer and the screen to provide standard sign-on.

Typically step (e) is further practiced to control the computer and the display screen to provide a query as to whether the user is one of the registered users displayed on the screen, and if the query response is negative, bypassing step (f) and controlling the computer to preclude standard sign-on to the computer software until an authorizing registration sequence has been entered into the computer. Step (b) may be practiced to provide a freshness interval of between one and five weeks.

According to another aspect of the present invention, apparatus is provided for authentication for a computer software program sign-on. The apparatus comprises the following elements:

A computer. A display screen connected to and controlled by the computer. Means for entering commands into the computer. And, means for providing a predetermined task to the computer, comprising: means for requiring entry of a registration name at the time of initial use of the computer software program and for storing the registration name in an Init-File; means for providing a freshness interval based upon number of sign-ons or the passage of time as the maximum allowable hiatus between re-authentication sign-ons; means for at each invocation of the computer software program determining if an invocation is within the freshness interval; means for, if the invocation is within the freshness interval, controlling the computer and display screen to provide standard sign-on; means for, if the invocation is not within the freshness interval, controlling the computer and display screen to provide a re-authentication query on the display screen which requires a response before standard sign-on will be allowed; means for, if the correct response to the query is given, controlling the computer and display screen to provide standard sign-on; and means for, if an incorrect response to the query is given, controlling the computer and display screen to provide information about authorized registration.

The software program may further comprise means for precluding standard sign-on to the computer software until an authorizing registration sequence has been entered into the computer. The means for, if an incorrect response is given, controlling the computer and display screen to provide information about authorized registration may comprise means for, at least in part, providing a phone or fax number, or both, which may be contacted for appropriate registration information, on the display screen. Also, the means for, if the invocation is not within the freshness interval, controlling the computer and display screen to provide a re-authentication query on the display screen which requires a response before standard sign-on will be allowed, may comprise means for controlling the display screen to pose thereon as a query what name, using the same spelling, the software program was initially registered under.

It is the primary object of the present invention to provide, in a simple and effective manner, a level of authentication for a computer based software program which is intermediate trust-based licensing and hardware-based protection. This and other objects of the invention will become clear from an inspection of the detailed description of the invention, and from the appended claims.

BRIEF DESCRIPTION OF THE DRAWINGS

FIG. 1 is a perspective schematic view of exemplary apparatus according to the invention that could be utilized in the practice of the methods of the present invention;

FIGS. 3 and 4 are flow sheets showing exemplary modifications of the re-authorization portion of the flow sheet of FIG. 2; and FIG. 5 is a schematic of an exemplary data structure for the Initialization and Chalkmark files.

DETAILED DESCRIPTION OF THE DRAWINGS

Figure 2:
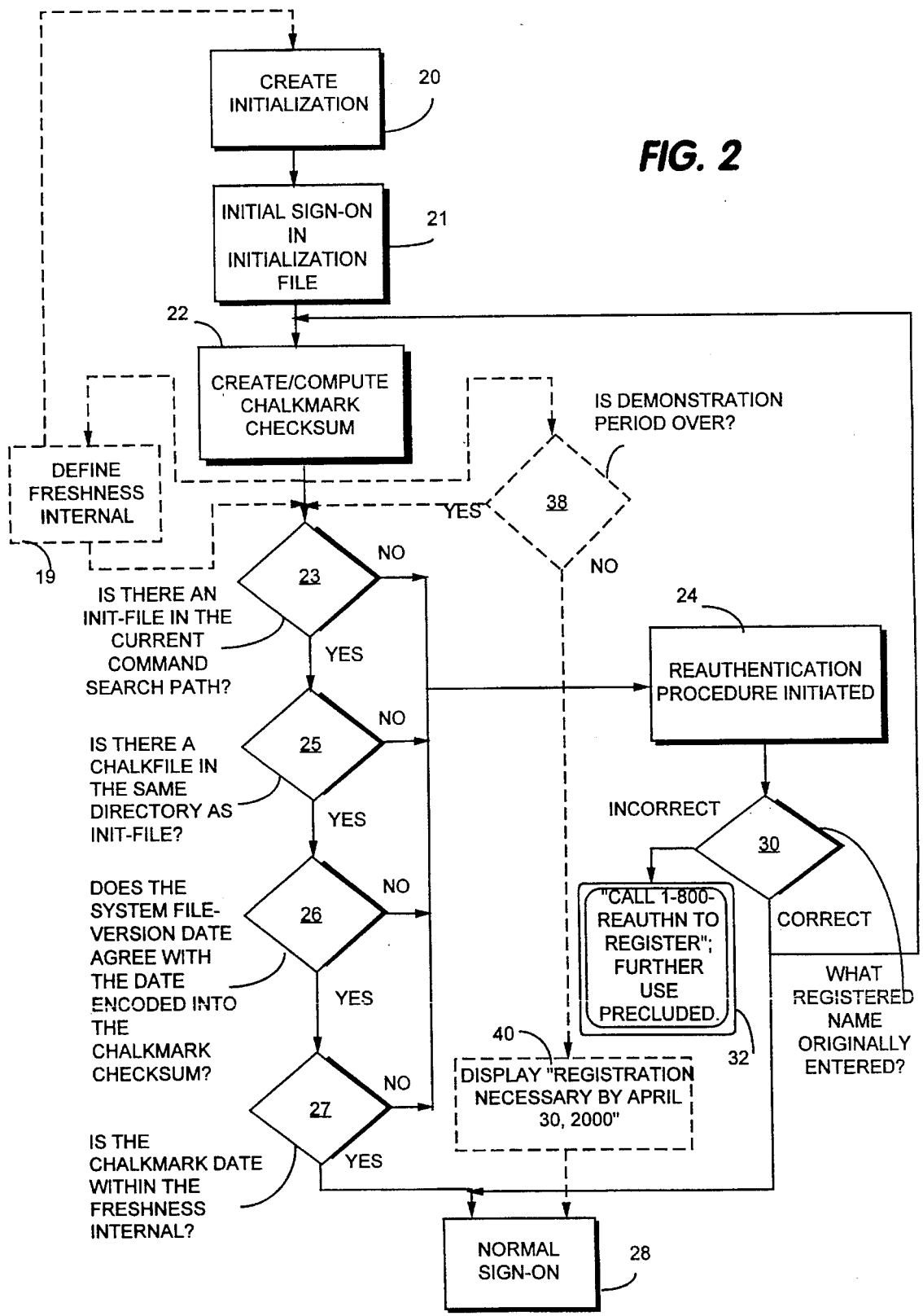
FIG. 2 is a flow sheet showing an exemplary complete method according to the invention.

Exemplary apparatus according to the invention is illustrated schematically at 10 in FIG. 1. It includes a computer 11, a display screen 12 controlled by the computer 11, and means for entering commands into the computer 11. The computer 11 may be a personal computer, lap top, networked computer, main frame, microcomputer, or any other type. The command-entering means may comprise a keyboard 13, a mouse 14, and/or any of a variety of other conventional voice-activated, mechanical, or automatic entry devices.

The apparatus 10 also includes a software program loaded onto the computer 11 and having a standard sign-on procedure (as earlier defined). The program may be provided on a disk 15, on tape, or transmitted to the computer 11 over a modem 16, or may be loaded onto the computer 11 in any other known manner. The software program may be Shell++ based, or based on other languages or protocols. The software program, each time it is invoked, provides at least one, and typically a series of, tests to determine if an authentication dialog was successfully completed within the recent past. The recent past is preferably measured by time, although it could be measured by the number of sign-on procedures instead of time.

The software program, e.g. on disk 15, comprises means for providing a predetermined task to the computer 11, requiring entry of a registration name at the time of initial use of the computer software program and storing the registration name in an Init-File, with the computer 11 hardware, loaded with instructions from the program (e.g. on disk 15) comprising: means for providing a freshness interval based upon number of sign-ons (e.g. 30) or the passage of time (e.g. about 1–5 weeks) as the maximum allowable hiatus between re-authentication sign-ons; means for at each invocation of the computer software program determining if an invocation is within the freshness interval; means for, if the invocation is within the freshness interval, controlling the computer 11 and display screen 12 to provide standard sign-on; means for, if the invocation is not within the freshness interval, controlling the computer 11 and display screen 12 to provide a re-authentication query on the display screen 12 which requires a response before standard sign-on will be allowed; means for, if the correct response to the query is given, controlling the computer 11 and display screen 12 to provide standard sign-on; and means for, if an incorrect response to the query is given, controlling the computer 11 and display screen 12 to provide information about authorized registration.

The method of controlling the computer 11 and display screen 12, utilizing the software program, according to the present invention is schematically illustrated in FIG. 2. The freshness interval is predefined, as illustrated at 19, by the provider of the software. The freshness date is the maximum interval between authentication dialogues (e.g. 30 days).

The initialization file is created, as illustrated at 20, and an initial sign-on is required, as indicated at 21. For example, at 21 a registered user's name must be entered, e.g. "ABCDEFGH". An exemplary data structure for the Initialization File is schematically illustrated in FIG. 5 (also showing a data structure for a Chalkmark File).

Both the serial number and the authorized user's name are used to customize the software to include a Checksum and an Init-File that will be created by the installation procedure. If the software is sold and shipped by a primary distributor, the authorized user's name can be obtained before packaging. Alternatively, if the user's name is not prepackaged, the user is instructed to call the distributor to obtain a registration for the product, supplying the serial number and the authorized user's name, and receiving in return a Checksum for entry into the Init-File. The Checksum for this entry may be, for example (if the Serial number is 1234567) 1234ABCD5678EFGH. Any method of producing a unique Checksum can be used. [For example, add together all the characters of the serial number and the user's name.]

Box 22 in FIG. 2 illustrates the creation/computation of a Chalkmark Checksum. After a successful authentication dialog (as described below) Shell++ controls the computer 11 to compute a deterministic function of serial number and the "Chalkmark Date" [i.e. the current date at the time of creating the Chalkmark File]. Shell++ records the Chalkmark Checksum into a Chalkmark File (Chalk-File), in the same directory as Init-File.

The first of the tests, previously referred to, is illustrated at 23 in FIG. 2, i.e. "is there an Init-File in some directory in the current command search path (PATH)?" If so, testing continues. If not a re-authorization procedure is initiated—see box 24. The next test, at 25, is "is there a Chalk-File in the same directory as Init-File". If so, testing continues. If not, a re-authorization procedure [24] is initiated. The next test, at 26, is "does the system's file version date for Chalk-File agree [plus or minus a small variation, such as one day] with the date encoded into the Chalkmark Checksum?" If so, testing continues. If not a re-authorization procedure [24] is initiated. The final test, at 27, utilizes the freshness date from box 19, and is "is the Chalkmark Date within the freshness interval of today's date?" If so, normal sign-on is provided, as indicated at 28 in FIG. 2. [As previously defined, "standard sign-on" as used in the present application and claims encompasses any and all sign-on procedures whether requiring entry of some sort of information (e.g. key strokes on a keyboard, click on a mouse, etc.), or merely opening up to the program]. If not, a re-authorization procedure [24] is initiated.

While all of the decision boxes 23, 25, 26, 27 are preferred, any number may be utilized, with 27 the most significant. Also while the tests represented by boxes 23, 25, 26, 27 are shown in a particular sequence, it is to be understood that this sequence is merely representative, and that they may be conducted in parallel, and in any desired sequence.

When re-authorization 24 is initiated, the software controls the screen 12 to display one or more queries, and information, which many or may not be dependant upon the response to the query or queries. For example, as indicated schematically at 30, the following query may appear on the screen 12: "When you registered your copy of Shell++ you registered your name as the Authorized user of this copy. Using the same spelling, enter your name: _____". The operator must then enter the name, using the keyboard 13 or mouse 14, etc. The software may then echo the name as entered, and ask for operator confirmation. Then the software controls computer 11 to compute the Checksum using the serial number from Init-File and the Authorized User Name as entered, and compares the calculation to the Checksum recorded in Init-File. If they match (both are 1234ABCD5678EFGH in this example), that is the entered name is correct, then the authentication dialog is complete, and conventional sign-on is provided [28]. If there is no match, the software controls screen 12 to display informational data, e.g. that the software must be registered before it can be used, displaying the phone and/or fax number and/or electronic address to contact if registration is to be effected, as illustrated schematically at 32 in FIG. 2, and further operation of the software on the computer 11 is precluded.

Each successful authentication procedure started with initiation box 24 (i.e. a correct match from decision box 30) results in the creation of a new Chalk-File, as indicated schematically by line 31 in FIG. 2. The new Chalk-File then forms the basis for tests 25–27.

FIG. 3 illustrates an alternative re-authentication procedure according to the invention, which is somewhat more "trust-based" than the procedure of FIG. 2, though not merely trust-based. In the procedure of FIG. 3, the software controls screen 12, as indicated at 34, to merely question the user as to whether or not he/she is the correct registered user, displaying the correct name on the screen 12. If the query is answered "yes", then normal sign-on 28 proceeds. If "no", screen 12 is controlled to at least display appropriate registration information, as indicated schematically at 32', but typically further utilization of the software is not precluded.

FIG. 4 illustrates yet another alternative re-authentication procedure, which is even more trust based than that of FIG. 3. In this procedure, as indicated at 36, the correct registered user information, as well as an electronic address or the like for registering the software, are displayed on screen 12 when re-authorization 24 is initiated, and—for example after a suitable automatic time delay, or by the operator depressing any key on keyboard 13—then normal sign-on [28] proceeds.

In situations where there are at least two successive versions of the computer software, better control over licensing of successive versions is obtained by using two checksum algorithms, a current-version checksum, and a prior-version checksum. With dual checksums, a user who has not paid a fee for the current version could be advised that the current version needs a new checksum (requires a payment, giving a phone/fax number), while still being allowed to use the software based upon the prior version license. This allows for a more cooperative transition period for licensed upgrades and new versions, compared to abrupt cutoff. To effect these purposes, the method comprises the further step of, when the re-authentication procedure 24 produces "no match" to the current-version Checksum (for any of the embodiments of FIGS. 2–4), controlling (with the software) the computer 11 and display screen 12 to compute the prior-version Checksum, as just described.

To accommodate a time based demonstration period the method of the invention may comprise, particularly for the FIG. 2 embodiment, the further step of running the software so that tests 23, 25, 26 and 27 are disabled for an initial predetermined period of time or number of sign-on procedures to provide a demonstration period, so that re-authorization procedure 24 is not initiated until after the demonstration period (e.g. ninety days, instead of a normal freshness period of, e.g., twenty days), the software controlling computer 11 and screen 12 in this regard. In implementing this procedure the method also preferably comprises the further step of controlling the computer 11 and display screen 12 to display a message on the display screen reminding the user, at least near the end of the demonstration period, that registration is necessary, and providing information about effecting registration. For example, after the first sixty days of a ninety day demonstration period control proceeds through decision box 38 and function box 40 shown in dotted line in FIG. 2, box 40 illustrated as controlling screen 12 so as to display a reminder of the upcoming date for registration (as well as information as to how to effect registration). After a predetermined short time delay, normal sign-on (28) then proceeds.

It will thus be seen that according to the present invention simple yet effective methods and apparatus provide a level of authentication for a computer software program sign-on intermediate trust-based licensing and hardware-based protection. While the invention has been herein shown and described in what is presently conceived to be the most practical and preferred embodiment, it will be apparent to those of ordinary skill in the art that many modifications may be made thereof within the scope of the invention, which scope is to be accorded the broadest interpretation of the appended claims so as to encompass all equivalent methods and devices.

What is claimed is:

1. A method of providing a level of authentication for a computer software program sign-on intermediate trust-based licensing and hardware-based protection, using a computer and a display screen having a standard sign-on procedure, comprising the steps of:

(a) requiring entry of a registration name at the time of initial use of the computer software program which is provided in an Init-File;

(b) providing a freshness interval based upon number of sign-ons or the passage of time as the maximum allowable hiatus between re-authentication sign-ons;

(c) at each invocation of the computer software program determining if an invocation is within the freshness interval;

(d) if the invocation is within the freshness interval, controlling the computer and display screen to provide standard sign-on;

(e) if the invocation is not within the freshness interval, controlling the computer and display screen to provide a re-authentication query on the display screen which requires a response before standard sign-on will be allowed;

(f) if a correct response to the query in step (e) is given, controlling the computer and display screen to provide standard sign-on, and starting a new re-authentication freshness interval so that steps (c)–(e) may be repeated; and (g) if an incorrect response to the query in step (e) is given, controlling the computer and display screen to provide information about authorized registration.

2. A method as recited in claim 1 wherein step (g) is further practiced to preclude standard sign-on to the computer software until an authorizing registration sequence has been entered into the computer.

3. A method as recited in claim 2 wherein step (g) is practiced, at least in part, by providing a phone or fax number or electronic address, or all, which may be contacted for appropriate registration information on the display screen.

4. A method as recited in claim 2 wherein step (e) is practiced to control the display screen to query what name, using the same spelling, the software program was initially registered under.

5. A method as recited in claim 4 wherein the software is a Shell++ product; and comprising the further step of controlling the computer, in response to the query posed in step (e), to calculate a Checksum using the serial number from the Init-File and the entered registered user name, and to compare the calculated Checksum to the Checksum recorded in the Init-File.

6. A method as recited in claim 2 wherein step (e) is practiced to control the display screen to display the name of one or more registered users and inquire as to whether or not sign-on is being practiced by a registered user.

7. A method as recited in claim 2 wherein the software is a Shell++ product.

8. A method as recited in claim 7 wherein at each invocation of the computer software also determining if there is an Init-File in some directory in the current command search path for the software, and if there is not requiring re-authentication by initiating steps (e)–(g).

9. A method as recited in claim 7 wherein in response to step (a) there are the further steps of controlling the computer to compute a Chalkmark Checksum, and encoding the Chalkmark Checksum in a Chalk-File and recording the date encoded; and wherein at each invocation of the computer software also determining (i) if there is a Chalk-File in the same directory as Init-File, and (ii) if the system's file-version date for Chalk-File is the same as, within a predetermined deviation range, the date encoded into the Chalkmark Checksum; and if there is not, requiring re-authentication by initiating steps (e)–(g).

10. A method as recited in claim 1 wherein step (b) is practiced to provide a freshness interval of between one and five weeks.

11. A method of providing a level of authentication for a computer software program sign-on intermediate trust-based licensing and hardware-based protection, using a computer and a display screen having a standard sign-on procedure, comprising the steps of:
(a) requiring entry of a registration name at the time of initial use of the computer software program which is provided in an Init-File;
(b) providing a freshness interval based upon number of sign-ons or the passage of time as the maximum allowable hiatus between re-authentication sign-ons;
(c) at each invocation of the computer software program determining if an invocation is within the freshness interval;
(d) if the invocation is within the freshness interval, controlling the computer and display screen to provide standard sign-on;
(e) if the invocation is not within the freshness interval, controlling the computer and display screen to provide a re-authentication query on the display screen which requires a response before standard sign-on will be allowed;
(f) if a correct response to the query in step (e) is given, controlling the computer and display screen to provide standard sign-on, and starting a new re-authentication freshness interval so that steps (c)–(e) may be repeated;
(g) if an incorrect response to the query in step (e) is given, controlling the computer and display screen to provide information about authorized registration; and
wherein there are at least two successive versions of the computer software, and comprising the further step of controlling the computer and display screen to provide a different Checksum for each of the versions to initiate steps (e)–(g) if one of the versions had not be properly registered.

12. A method of providing a level of authentication for a computer software program sign-on intermediate trust-based licensing and hardware-based protection, using a computer and a display screen having a standard sign-on procedure, comprising the steps of:
(a) requiring entry of a registration name at the time of initial use of the computer software program which is provided in an Init-File;
(b) providing a freshness interval based upon number of sign-ons or the passage of time as the maximum allowable hiatus between re-authentication sign-ons;
(c) at each invocation of the computer software program determining if an invocation is within the freshness interval;
(d) if the invocation is within the freshness interval, controlling the computer and display screen to provide standard sign-on;
(e) if the invocation is not within the freshness interval, controlling the computer and display screen to provide a re-authentication query on the display screen which requires a response before standard sign-on will be allowed;
(f) if a correct response to the query in step (e) is given, controlling the computer and display screen to provide standard sign-on;
(g) if an incorrect response to the query in step (e) is given, controlling the computer and display screen to provide information about authorized registration; and
(h) controlling the computer and display screen so that steps (e)–(g) are disabled for an initial predetermined period of time or sign-on procedures to provide a demonstration period.

13. A method as recited in claim 11 comprising the further step of controlling the computer and display screen to display a message on the display screen reminding the user, at least near the end of the demonstration period, that registration is necessary, and providing information about effecting registration.

14. A method of providing an authentication procedure for a computer software program sign-on, using a computer and a display screen having a standard sign-on procedure, comprising the steps of:
(a) requiring entry of a registration name at the time of initial use of the computer software program which is provided in an Init-File;
(b) providing a freshness interval based upon number of sign-ons or the passage of time as the maximum allowable hiatus between re-authentication sign-ons;
(c) at each invocation of the computer software program determining if an invocation is within the freshness interval;
(d) if the invocation is within the freshness interval, controlling the computer and display screen to provide standard sign-on;
(e) if the invocation is not within the freshness interval, controlling the computer and display screen to display the name of one or more registered users and inquire as to whether or not sign-on is being practiced by a registered user and to simultaneously provide information about authorized registration and starting a new re-authentication freshness interval so that steps (c) and (d) may be repeated; and
(f) after step (e) controlling the computer and the screen to provide standard sign-on.

15. A method as recited in claim 14 wherein step (e) is further practiced to control the computer and the display screen to provide a query as to whether the user is one of the registered users displayed on the screen, and if the query response is negative, bypassing step (f) and controlling the computer to preclude standard sign-on to the computer software until an authorizing registration sequence has been entered into the computer.

16. A method as recited in claim 14 wherein step (b) is practiced to provide a freshness interval of between one and five weeks.

17. Apparatus for providing authentication for a computer software program sign-on, comprising:
a computer;
a display screen connected to and controlled by said computer;
means for entering commands into said computer; and
means for providing a predetermined task to said computer comprising:
means for requiring entry of a registration name at the time of initial use of said computer software program and for storing said registration name in an Init-File;

means for providing a freshness interval based upon number of sign-ons or the passage of time as the maximum allowable hiatus between re-authentication sign-ons;

means for at each invocation of said computer software program determining if an invocation is within the freshness interval;

means for, if the invocation is within the freshness interval, controlling said computer and display screen to provide standard sign-on;

means for, if the invocation is not within the freshness interval, controlling said computer and display screen to provide a re-authentication query on said display screen which requires a response before standard sign-on will be allowed;

means for, if the correct response to the query is given, controlling said computer and display screen to provide standard sign-on and starting a new re-authentication freshness interval using said means for providing a freshness interval; and means for, if an incorrect response to the query is given, controlling said computer and display screen to provide information about authorized registration.

18. Apparatus as recited in claim 17 wherein said software program further comprises means for precluding standard sign-on to said computer software until an authorizing registration sequence has been entered into said computer.

19. Apparatus as recited in claim 18 wherein said means for, if an incorrect response is given, controlling said computer and display screen to provide information about authorized registration comprises means for, at least in part, providing a phone or fax number, or electronic address, or all, which may be contacted for appropriate registration information, on said display screen.

20. Apparatus as recited in claim 18 wherein said means for, if the invocation is not within the freshness interval, controlling said computer and display screen to provide a re-authentication query on said display screen which requires a response before standard sign-on will be allowed, comprises means for controlling said display screen to pose thereon as a query what name, using the same spelling, said software program was initially registered under.

* * * * *